Oct. 7, 1958   F. C. LORNITZO   2,854,995
RELIEF VALVE
Filed Aug. 3, 1953   2 Sheets-Sheet 2

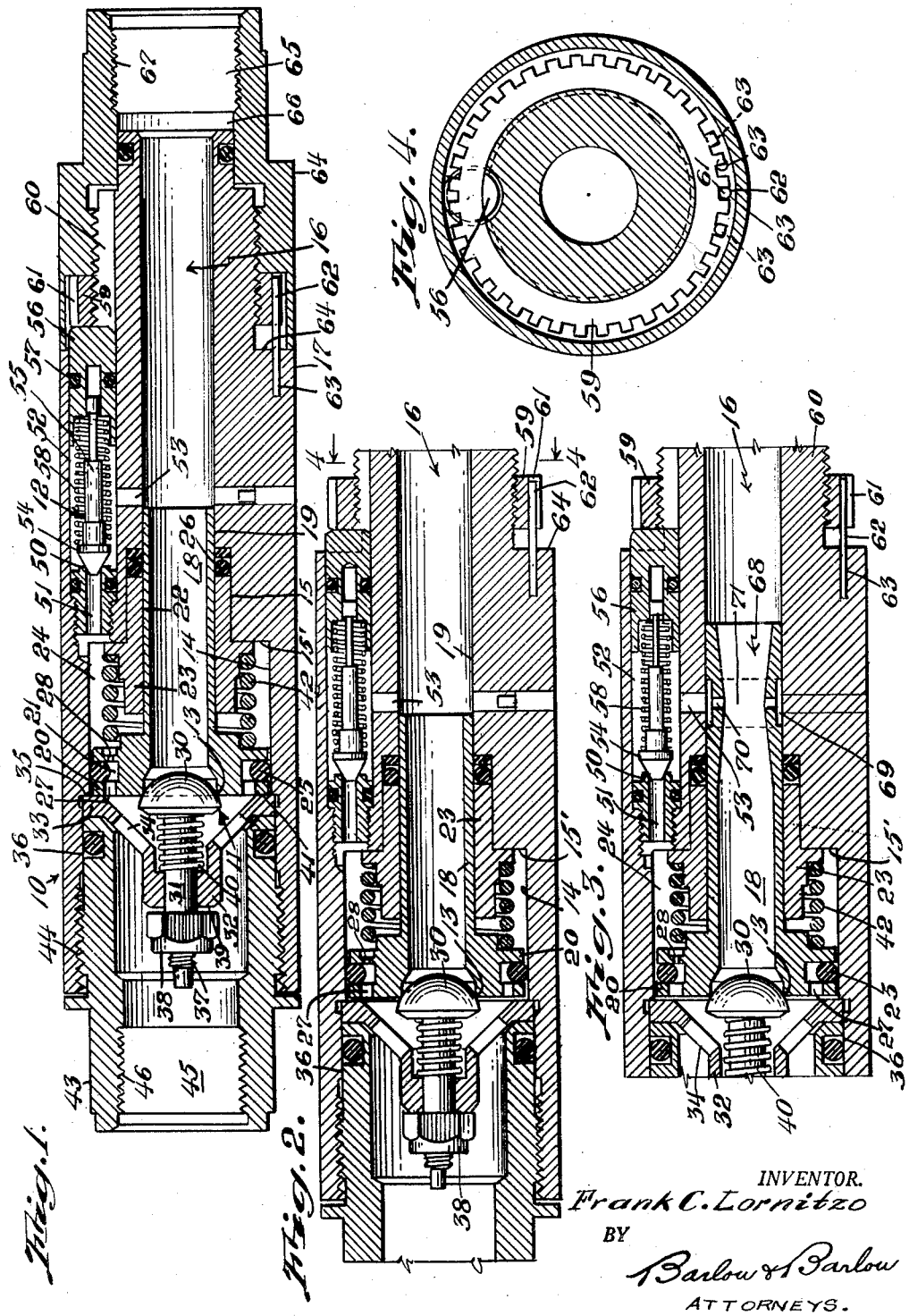

INVENTOR.
Frank C. Lornitzo
BY
Barlow & Barlow
ATTORNEYS.

United States Patent Office 2,854,995
Patented Oct. 7, 1958

2,854,995
RELIEF VALVE

Frank C. Lornitzo, Pawtucket, R. I., assignor to Pantex Manufacturing Corporation, a corporation of Delaware Application August 3, 1953, Serial No. 371,757

2 Claims. (Cl. 137—468)

This invention relates to a relief valve for use in high pressure hydraulic systems which may be subjected in operation to varying temperature conditions.

An object of the invention is to provide a relief valve which will operate equally well at high and also at extremely low temperatures.

Another object of the invention is to provide a relief valve having a pressure differential creating chamber into which a fluid under pressure may be admitted at substantially the same rate of flow at either high or low temperatures.

Another object is to provide a relief valve which will fully open and close within a reasonably small percentage of variance from predetermined opening and closing pressure.

Another object is to provide a relief valve having a straight flow passage therethrough extending from the pressure end to the return end of the valve.

Another object is to provide a relief valve having a pressure responsive main valve controlled by a pressure responsive poppet valve at a position removed from the relief flow passage through the valve.

Another object is to provide a relief valve having a pressure responsive main valve controlled by a pressure responsive poppet valve in which both valve structures will control flow passages spaced from and extending parallel to each other.

Another object is to provide a relief valve so constructed as to utilize the relief flow as an aid to move the valve to fully open position.

A more specific object is to provide in the relief conduit a pressure creating device to utilize the relief flow therethrough as an aid for moving the valve to fully open position after the initial cracking thereof.

Another object is to provide a relief valve so constructed as to eliminate hunting action prior to the establishing of a stable pressure condition.

Another object is to provide a relief valve in which a poppet valve having an adjustable pressure controlling spring bias is retained in a vernier-like adjusted position by a locking arrangement.

Another object is to provide a relief valve in which a poppet valve, having an adjustable pressure controlling spring bias acting thereon, is adapted to be manually adjusted and locked in adjusted position without the aid of tools.

Another object is to provide a relief valve structure having a relief flow passage adapted for use as a return flow passage through the valve.

Another object is to provide a relief valve having a main valve seat and a main valve head, each spring biased for movement towards each other.

With these and other objects in view, the invention consists of certain novel features of construction as will be more fully described and particularly pointed out in the appended claims.

In the accompanying drawings:

Figure 1 is a longitudinal sectional view through a relief valve embodying my invention;

Figure 2 is a similar view of a fragmental portion of the valve shown in Figure 1 with certain elements shown in different relation than shown in Figure 1;

Figure 3 is also a similar view of a fragmental portion of the valve structure shown in Figure 1 showing a modified relief flow passage therethrough;

Figure 4 is a sectional view taken substantially along lines 4—4 of Figure 2 looking in the direction of the arrows and on an enlarged scale;

Figure 5:
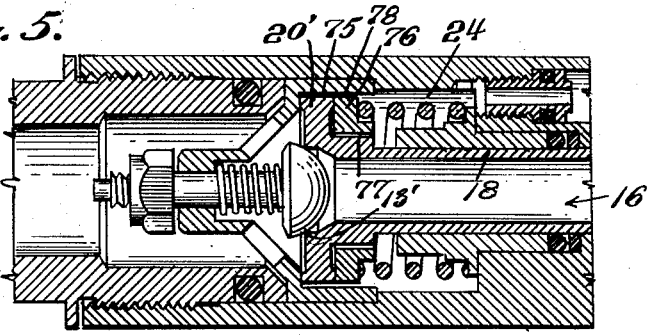
Figure 5 is a fragmental central sectional view through the valve structure showing a modified arrangement for controlling the passage of pressure fluids into a pressure chamber.

The valve according to the present invention comprises a sliding valve seat having a head with a portion within a pressure chamber and having another portion or face exposed to fluid pressure from the pressure end of the valve and its opposite side to fluid pressure in the chamber which is admitted therein through a restricted opening in said head about a passage leading from the pressure end of the valve. There is a poppet valve which has a predetermined spring bias thereon normally holding the same closed which controls the outflow of fluid from said chamber. Upon an increase in fluid pressure in said chamber to overcome the bias on said poppet valve, the same will crack open to establish a flow from said chamber and reduce the pressure therein to cause a pressure differential across the head of the valve seat in a direction to move the seat to open the relief passage to the flow of fluid from the pressure end of the valve.

The initial opening movement of the poppet valve is very slight, and the drop in pressure in the chamber will not be such as to cause a sufficient differential across the head to permit the valve seat to be moved to fully open position, and it will require an increase in pressure in said chamber to move the poppet valve to fully open position to evacuate the said chamber. In order to compensate for this increased pressure requirement and maintain the same within a reasonable percentage increase of the poppet valve cracking pressure, there is formed in the relief flow passage a pressure differential creating arrangement which is placed in communication with the outflow passage from the chamber. As the relief flow increases through the relief passage, an ejector action occurs to suck fluid from said outflowing passage which is reflected in the said chamber to provide a sufficient pressure differential across said valve seat to move the same to open position in an amount sufficient to provide a relief flow of predetermined amount through the valve without materially increasing the size of opening of the poppet valve above that of the cracking thereof, thus reducing to a marked degree the increase in pressure normally required in the said chamber for additionally moving the poppet valve to a more fully opened position beyond the cracking thereof to cause said sufficient differential across the valve seat.

With reference to the drawings, 10 designates the body or casing which has progressively smaller bores 36, 14, 15, 19 extending inwardly from the pressure end thereof. A shoulder is provided at 35 between bores 36 and 14 and a shoulder 15' between bores 14 and 15. These bores are all on the same axis providing a straight line opening 16 through the body. A guide 23 is located in the bore 15 and has a flange engaging shoulder 15.' A seal 26 is provided at its lower end. This guide has its own bore 22 in which the sleeve 18 slides and which sleeve provides the slidable valve seat 13 in the head 20 thereof. In the periphery of head 20 there is a recess 21 for receiving the O-ring seal 25 which slidably engages the bore 14. A chamber 24 is provided between the walls of the bore 14 and the sleeve 18 and its guide 23, which is separated from the pressure at the high-pressure end of the valve by the head 20. Openings 27 and control opening 28 are provided through the head 20 connecting with the chamber 24 so that when the sleeve or sliding part of the valve is in closed position, there will be transmitted to the chamber 24 the same pressure as exists at the pressure end of the valve. Thus, the entire head is enveloped in fluid of the same pressure and the arrangement is such that the pressure on the face of the sleeve 18 and that on the side of the head exposed to the fluid in chamber 24 will be equal. This equality is provided by causing the valve seat 13 to be of the same diameter as the outer diameter of the sleeve 18.

A pressure responsive main valve structure 11 which is controlled by a pressure responsive pilot or poppet valve structure 12 which is exposed to relief port pressure tending to move the same to open position and is yieldingly biased to oppose such fluid pressure. Upon an increase of relief port pressure to overcome the said bias, the said poppet valve will move to open position to provide for a pressure differential across the main valve 11 in a direction for the fluid pressure to move the same to open position for the passage of relief fluid through the valve.

Co-operating with the main valve seat 13 is a main valve head 30 which is of semi-spherical shape and provided with a stem 31 which is slidably mounted in a support 32 which has an inclined annular flange 33 provided with a plurality of openings 34 therethrough for the passage of fluid past the support. The flange 33 abuts against an annular shoulder 35 which is formed between the bores 36 and 14. The stem 31 has a threaded reduced end portion 37 which extends beyond the support 32 and receives a nut 38 which is engageable against a stop 39 formed by the adjacent side of the support 32 and limits the axial movement of the said head 30 towards the seat 13. A compression spring 40 biases the head 30 into engagement with the valve seat 13 to normally close the passage 16.

The flange 33 forms the outer end wall of chamber 24 or annular shoulder 41 against which the head 20 of the sleeve 18 is biased by a spring 42. Since the sleeve 18 is in balance to fluid pressure, the spring 42 may be relatively light and of only sufficient force to overcome the spring 40 and the frictional opposing force to the sliding movement of said sleeve towards said shoulder 41. The support 32 is secured in position by an end cap 43 which threadedly engages the wall of the bore 36 as at 44 and extends into engagement with the flange 33 to clamp the same between said cap and shoulder 35. The cap 43 has a bore 45 therethrough, the inner end portion of which forms a relief pressure port and the outer end portion of which is threaded as at 46 by means of which the valve may be placed in communication with the pressure side of a hydraulic system (not shown).

The poppet valve structure 12 comprises a poppet valve seat 50 located in a second passage 51 leading from the chamber 24 to a poppet valve chamber 52 which is formed by a bore extending inwardly from the low-pressure end 17 of the body 10 and parallel to the bores 15 and 19. Extending from the chamber 52 is a radial opening 53 which opens into the bore 19 at a location closely adjacent to the end of the sleeve 18.

Co-operating with the poppet valve seat 50 is a poppet valve having a conical head 54 adapted to engage the seat 50 and provided with a stem 55 slidably guided in a poppet guide 56. The guide 56 is slidable in the chamber 52 and an O-ring packing 57 provides a fluid-tight seal about said guide. There is a compression spring 58 which surrounds the stem 55 and one end of which bears against the head 54 and the other end against the guide 56 which extends outwardly of the chamber 58 into engagement with an adjusting nut 59 which threadedly engages the outer reduced end 60 of the valve body. Thus, by adjusting the nut 59, the bias pressure of the spring 58 applied to the head 54 to urge the same on the seat 50 can be altered as desired.

With a view of locking the adjustment of the spring 58 after proper predetermined adjustment has been made, the periphery of the nut 59 (see Figures 1 and 4) is notched as at 61 to receive a pin 62 to enter a chosen opening 63 in the shoulder 64 formed by the reduced portion 60. There is a plurality of notches 61 and, as shown in Figure 4 as by way of example, these are spaced 10 degrees apart. The openings 63 are four in number, and these are spaced 12 degrees apart, which provides a difference between the spacing of the notches and that of the openings of but two degrees. Thus, the nut may be turned but 1 degree to register a notch 61 with one of the four openings 63, and a fine vernier-like lock adjustment may be had for the nut 59. A cap 64 screwing on the reduced end 60 is provided to cover the nut 59 after the adjustment and locking thereof has been effected. The cap has an opening 65 therethrough axially in line with the passage 16 and the inner portion may be referred to as the return port 66. The outer end of the cup is threaded as at 67 by which the valve may be placed in communication with the low-pressure side of a hydraulic system (not shown).

In operation the valve seat 13 will normally remain seated on the valve head 30 due to the fluid pressure in chamber 24 being the same as the fluid pressure at the pressure end and the head 30 being balanced to said pressure. The poppet valve also will be normally seated under urge of the predetermined spring bias thereon. Upon an increase in pressure in chamber 24 to overcome the bias of the poppet valve head 54, the same will crack or open and an outflow of fluid will be had from pressure chamber 24 through passage 51, chamber 52, and out through radial opening 53 into the bore 19. This outflow of fluid will be somewhat in excess to the inflow into the chamber 24 through restricted opening 28, and there will be a pressure drop in the chamber 24. This will set up a pressure differential across the head 20 of the valve seat element in a direction causing the said seat 13 to move from this closure 30. Upon the cracking of the main valve or seat 13 a flow of relief fluid will be had through the passage 16. The amount of flow through passage 16 will depend upon the amount of opening of the valve seat 13, which in turn will depend upon the amount of opening of the poppet valve to provide a wider difference between the outflow from the pressure chamber and the inflow thereto through restricted opening 28. Thus, an increase in pressure in chamber 24 will be required to move the poppet valve against the opposing force of the bias thereon, which increases as the poppet valve moves from the seat 50.

In the present disclosure this required increase in pressure in chamber 24 to further move the poppet valve from seat 50 to in turn create a sufficient pressure differential across head 20 to additionally move valve seat 13 from the closure 30 is compensated for in the following manner. The flow through the passage 16 will tend to leave the bore 22 of smaller diameter and enter the bore 19 of larger diameter in a straight line and expand to the full diameter of the bore 19 at a point or location slightly beyond the radial opening 53 and set up an ejector action which will cause a low pressure or partial vacuum in the outflow passage which will be reflected in chamber 24 to suck fluid therefrom in excess of the inflow therein to further lower the fluid pressure in the chamber 24 to increase the pressure differential across the head 20 to additionally open the passage 16 and increase the flow. This increased flow will further enhance the ejector suction action in the outflow passage from chamber 24 to maintain a fluid pressure against the poppet valve to maintain the same open without any material increase in pressure above a predetermined opening pressure. Thus a full relief flow at a predetermined pressure may be attained with a minimum of increase in pressure from that predetermined by the bias of spring 58.

The flow of fluid from the bore 22 into the bore 19 forms a venturi-like flow through the passage 16 and the diameters of the bores 22 and 19 can be mathematically computed for the suction action desired. By suitably proportioning the said bores, the difference in pressure between that of chamber 24 and chamber 52 can be well controlled.

In some valve constructions in which the difference in the diameter of the bores 22 and 19 cannot be controlled in a practical manner, a differential pressure-creating device as shown in Figure 3 may be provided. This comprises forming the low-pressure end portion of the sleeve 18 with a venturi-like ending designated 68 having an annular recess 69 at the throat portion in communication through radial openings 70 with the bore 71 of the venturi. The recess 69 is positioned to be opposite and in register with the opening 53. Thus, a pressure differential may be set up in chamber 52 and be nicely controlled to effect the required evacuation of chamber 24 to cause a sufficient pressure drop therein for creating a pressure differential across the head 20 to move main valve seat 13 from the main valve head 30 sufficiently to obtain a flow of relief fluid of predetermined pressure through passage 16 within a reasonable percentage increase in relief pressure above that required for cracking the poppet valve as predetermined by the bias of spring 58.

Upon a drop in relief pressure at the pressure relief port as predetermined by the bias of spring 58, the poppet valve will return to poppet valve seat 50 and close the passage 51 to the ejector action of the flow through passage 16. The chamber 24 will fill through restricted opening 28, and the pressure on both sides of the head 20 will be the same, and the valve seat 13 will under bias of spring 42 return into engagement with main valve head 30 to close the passage 16. Since the main valve is balanced to fluid pressure, a relatively light spring bias on the said seat 13 will move the same to close passage 16.

During the operation of the hydraulic system (not shown) in which the valve is in use, there may be a sudden increase in relief pressure to cause a momentary difference in fluid pressure on both sides of the head 20 due to the restricted opening 28 being incapable of response to this sudden increase in pressure. At this increased pressure condition a pressure differential will be had across the head 20 in a direction tending to move the seat 13 from the main head 30. The main valve head 30 is also exposed to fluid pressure acting thereon in a direction tending to move the same into engagement with the seat 13, and thus both the valve seat and valve head will move in unison and remain in engagement with each other during momentary increases in fluid pressure. Should the increased pressure be stable, a further movement of the valve seat and valve head will be had in the same direction. The nut 38 will engage against the stop 39 as shown in Figure 2 and place the main valve structure in a condition which upon further increase in fluid pressure or differential across the valve seat 13 will move the same from the main valve head 30 to open passage 16. By suitable adjustment of the nut 38, the normal spacing between the same and the stop 39 may be chosen to predetermine the distance of movement of the main valve structure 11 prior to a separation of the valve seat 13 and head 30 and thus compensate for any sudden momentary increase or fluctuation in fluid pressure prior to a stable increased pressure condition having been established in the hydraulic system and thus eliminates hunting action of the main valve structure 11.

The fluid used in a hydraulic system subjected to varying temperature conditions, such for example as is used for controlling different elements of an airplane and like vehicles, is usually an oil, the viscosity of which changes in accordance with temperature, and thus its flow characteristic through the restricted opening 28 will change. At low temperature the rate of flow through a particular size orifice will be slower than its rate of flow through the same orifice at a higher temperature and its rate of flow will be proportional to the pressure of the flow up to only a critical pressure beyond which the flow characteristic will change. Normally such changes in flow rate of the hydraulic fluid will effect the operation of the valve so that it will be different at different temperatures. Thus, a valve operating properly within a certain temperature range may not operate equally well within a different temperature range. In order to provide for the valve to operate equally well at different temperatures, I make the wall through which the restricted opening 28 passes relatively thin and have found that the rate of the flow through the opening is reasonably constant even when the valve is operated at very low temperature.

In some instances (see Figure 5) I may provide an annular passage 75 leading from the pressure end of the valve to chamber 24. This passage 75 is formed by spacing the head 20' from the wall of chamber 24 and is controlled by an annular member or ring 76 which is loosely received on the enlarged portion 77 of the sleeve 18 of the valve seat 13'. The ring 76 is spaced from the wall of chamber 24 to form the controlled portion 78 of the said passage 75. The ring 76 is made of a material different from the wall of the chamber 24 and by the proper choice of material which has a coefficient of expansion which nearly approaches the flow curve of the hydraulic fluid at different temperatures, the size of controlled portion 78 of the passage 75 may be nicely controlled by the expansion or contraction of the said ring in response to temperature changes so as to vary the size of the passage 75 for changes in viscosity of the fluid and thus a flow into chamber 24 at a reasonably constant rate is provided.

Figure 6:
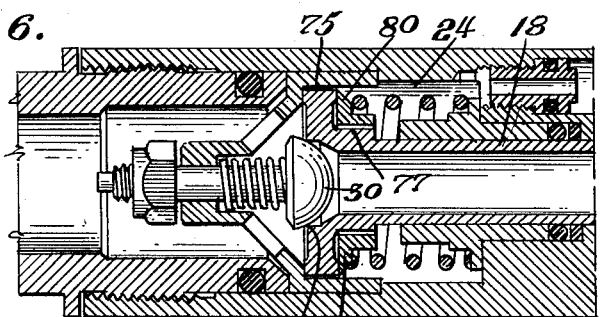
Figure 6 is a similar view showing a further modification.

In other instances (see Figure 6) I may provide an annular passage 75 as above and control the passage by a fixed restriction at the discharge end of the passage. This is accomplished by a ring 79 which is similarly received on the enlarged portion 77 of the sleeve 18 and has a knife-edge periphery 80 spaced the proper distance from the wall of chamber 24. The hydraulic fluid will flow by this annular knife edge at a rate of flow constant for different viscosities of the fluid due to the varying temperatures at which the valve may operate.

As previously described and more clearly shown in Figure 1, the passage 16 is continuous and straight through the valve with the main valve head 30 extending from the pressure end of the valve and spring biased into engagement with the leading edge of the passage 16. Thus, a return conduit is provided with a check valve therein which eliminates the usual by-passing of the relief valve in certain hydraulic systems.

Figure 7:
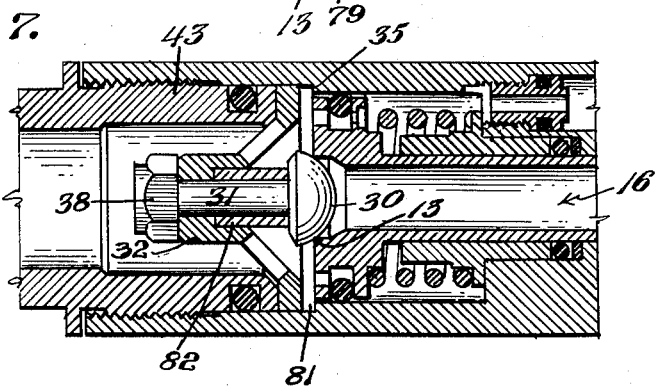
Figure 7 is also a similar view but showing a modified arrangement of main valve closure.

In Figure 7 there is shown a modified valve structure in which the main valve support 32 is arranged to be slidably mounted in a space 81 provided between the inner end of the cap 43 and the shoulder 35. A bushing 82 encircles the stem 31 and is clamped in position between the head 30 and the support 32 by the nut 38. Thus, the valve head 30 is rigidly held to the said support 32 to move therewith. The remaining structure is the same as that shown in Figure 1. The operation of this modified valve is substantially the same as that of Figure 1. Both the valve seat 13 and the head 30 initially move in unison under fluid pressure, and the distance of this movement in unison is dependent upon the spacing

I claim:

1. A relief valve for use in a hydraulic system comprising a body having a straight line relief passage therethrough, a valve comprising a slidable sleeve in said passage adapted to co-operate with a closure to control the flow of fluid through said passage, a pressure chamber within said body at a location spaced from said passage, a controlled passage leading from the pressure end of said relief valve into said chamber for admitting fluid into said chamber from said pressure end, said valve sleeve having a head within said chamber provided with opposite equal pressure areas with the face side of said head being subjected to pressure from the said pressure end and the rear side of said head being subjected to pressure within said chamber, said sleeve providing a passage portion of a diameter smaller than said relief passage and intermediate the ends of said passage, a second passage leading from said chamber and opening into said relief passage closely adjacent the end of the passage portion of smaller diameter, a poppet valve for controlling said second passage and subjected to the fluid pressure in said chamber tending to move said poppet valve to open position and spring biased to oppose said pressure and yieldable upon a predetermined fluid pressure to open said second passage to the flow of fluid from said chamber to cause a pressure differential across said head in a direction to move said slidable valve from said closure whereupon the flow of relief fluid through said relief passage will set up an ejector action across said opening due to the drop in pressure as the fluid passes from the passage portion of smaller diameter into the portion of larger diameter to suck and withdraw fluid from behind said head to cause an additional pressure drop in said chamber to additionally move the valve element from the said closure.

2. A relief valve as in claim 1 wherein said sleeve terminates along said relief passage and said second passage opens into the relief passage closely adjacent but beyond the point of termination of said sleeve.

References Cited in the file of this patent

UNITED STATES PATENTS

| | | |
|---|---|---|
| 321,214 | Curtis | Aug. 17, 1880 |
| 1,648,884 | Giesler | Nov. 8, 1927 |
| 2,017,311 | Jacobson | Oct. 15, 1935 |
| 2,158,478 | Parker | May 16, 1939 |
| 2,333,522 | Clifton | Nov. 2, 1943 |
| 2,351,871 | Parker | June 20, 1944 |
| 2,388,820 | Bonnell | Nov. 13, 1945 |
| 2,576,300 | Kreiner | Nov. 27, 1951 |
| 2,661,763 | Renick | Dec. 8, 1953 |
| 2,689,583 | Gardiner | Sept. 21, 1954 |
| 2,719,532 | Grant | Oct. 4, 1955 |
| 2,820,605 | Dougherty | Jan. 21, 1958 |

FOREIGN PATENTS

| | | |
|---|---|---|
| 659,079 | Great Britain | Oct. 17, 1951 |